(12) United States Patent
Magro (10) Patent No.: US 11,422,707 B2
(45) Date of Patent: Aug. 23, 2022

(54) SCHEDULING MEMORY REQUESTS FOR A GANGED MEMORY DEVICE

(71) Applicant: Advanced Micro Devices, Inc., Sunnyvale, CA (US)

(72) Inventor: James Raymond Magro, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/851,479

(22) Filed: Dec. 21, 2017

(65) Prior Publication Data

US 2019/0196721 A1    Jun. 27, 2019

(51) Int. Cl.
| | | |
|---|---|---|
| *G06F 13/16* | (2006.01) | |
| *G06F 9/50* | (2006.01) | |
| *G06F 3/06* | (2006.01) | |
| *G06F 12/10* | (2016.01) | |

(52) U.S. Cl.
CPC .......... *G06F 3/0611* (2013.01); *G06F 3/0659* (2013.01); *G06F 3/0673* (2013.01); *G06F 9/5011* (2013.01); *G06F 12/10* (2013.01); *G06F 13/1631* (2013.01); *G06F 13/1684* (2013.01); *G06F 3/0658* (2013.01); *G06F 13/1626* (2013.01); *G06F 2212/1024* (2013.01)

(58) Field of Classification Search
CPC .... G06F 3/0611; G06F 3/0659; G06F 3/0673; G06F 12/10; G06F 3/0658
See application file for complete search history.

(56) References Cited

U.S. PATENT DOCUMENTS

| | | | |
|---|---|---|---|
| 5,446,855 A * | 8/1995 | Dang | G06F 3/0601 711/1 |
| 6,195,727 B1 * | 2/2001 | Islam | G06F 11/1076 711/114 |
| 6,457,078 B1 | 9/2002 | Magro et al. | |
| 6,526,484 B1 | 2/2003 | Stacovsky et al. | |
| 7,492,368 B1 | 2/2009 | Nordquist et al. | |
| 10,296,230 B1 | 5/2019 | Balakrishnan et al. | |
| 2003/0002376 A1 * | 1/2003 | Beat | G11C 7/1006 365/230.03 |

(Continued)

OTHER PUBLICATIONS

Cornell_cs_4410, a series of lectures that explain page tables. A snapshot taken from archive.org on Sep. 6, 2015 is attached to this office action. (Year: 2015).*

(Continued)

*Primary Examiner* — William E. Baughman
*Assistant Examiner* — Janice M. Girouard
(74) *Attorney, Agent, or Firm* — Kowert Hood Munyon Rankin and Goetzel PC; Rory D. Rankin (57) ABSTRACT

Systems, apparatuses, and methods for performing efficient memory accesses for a computing system are disclosed. A computing system includes one or more clients for processing applications. A memory controller transfers traffic between the memory controller and two channels, each connected to a memory device. A client sends a 64-byte memory request with an indication specifying that there are two 32-byte requests targeting non-contiguous data within a same page. The memory controller generates two addresses, and sends a single command and the two addresses to two channels to simultaneously access non-contiguous data in a same page.

19 Claims, 4 Drawing Sheets

(56) References Cited

U.S. PATENT DOCUMENTS

| | | | |
|---|---|---|---|
| 2006/0179213 | A1 | 8/2006 | Brittain et al. |
| 2014/0047155 | A1 | 2/2014 | Zheng et al. |
| 2014/0052906 | A1 | 2/2014 | Thyagarajan et al. |
| 2014/0122809 | A1* | 5/2014 | Robertson ............ G06F 12/084 |
| | | | 711/141 |
| 2015/0081967 | A1* | 3/2015 | Pan ....................... G06F 3/0656 |
| | | | 711/114 |
| 2018/0165201 | A1* | 6/2018 | Hashemi ............ G06F 12/0842 |
| 2019/0035473 | A1* | 1/2019 | Rajamani ................ G06F 3/061 |
| 2019/0205225 | A1* | 7/2019 | Kim ........................ G06F 3/061 |
| 2019/0206477 | A1* | 7/2019 | Kim ........................... G11C 5/04 |

OTHER PUBLICATIONS

IBM z/OS "TSOE Programming Guide" VErsion 2 Relase 1, SA32-0981-000 (Year: 2013).*

Technology brief, 9th edition, by Hewlett-Packard DEvelopment (Year: 2010).*

Lecture 6—Control Logic, available online at http://www.ee.ic.ac.uk/hp/staff/dmb/courses/dig2/3_Syncsm.pdf from teh IMperial College of LOndon (Year: 2009).*

Science & TEchnology definition of "interface" https://web.archive.org/web/20170822172413/https://www.encyclopedia.com/science-and-technology/computers-and-electrical-engineering/computers-and-computing/interface (Year: 2017).*

J. Stuecheli et al., "The virtual write queue: Coordinating DRAM and last-level cache policies," in ISCA, 2010, attached to this office action and available online at: https://dl.acm.org/doi/abs/10.1145/1816038.1815972 (Year: 2010).*

"18-447 Computer Architecture Lecture 21: main Memory" by Prof. Onur Mutlu, Carnegie Mellon University, Sprint 2015, Mar. 23, 2015 (Year: 2015).*

A web page from techtarget that devices the term 'queue' takend from a wayback snapshot of page https://whatis.techtarget.com/definition/queue taken in 2015, attached to this office action. (Year: 2015).*

18-447 Computer Architecture Lecture 21: Main Memory by Prof. Onur Mutlu of Carnegie Mellon University Spring 2015, Mar. 23, 2015 attached to this office action and available online at https://course.ece.cmu.edu/~ece447/s15/lib/exe/fetch.php?media=onur-447-spring15-lecture21-main-memory-afterlecture.pdf (Year: 2015).*

Carnegie Mellon University Electrical and Computer Engineering Course List (current) attached to this office action and available online at https://courses.ece.cmu.edu/ which documents that course 18-447 is an undergraduate introductory course. (Year: 2021).*

International Search Report and Written Opinion in International Application No. PCT/US2018/051791, dated Dec. 12, 2018, 13 pages.

Prabhakar et al., "Plasticine: A Reconfigurable Architecture for Parallel Patterns", 2017 ACM/IEEE 44th Annual International Symposium on Computer Architecture (ISCA), Jun. 24, 2017, pp. 389-402.

International Search Report and Written Opinion in International Application No. PCT/US2018/051858, dated Dec. 19, 2018, 12 pages.

* cited by examiner

SCHEDULING MEMORY REQUESTS FOR A GANGED MEMORY DEVICE

BACKGROUND

Description of the Related Art

Maintaining performance at relatively high levels typically requires quick access to stored data. Several types of data-intensive applications rely on quick access to data storage to provide reliable high-performance for several local and remote programs and their users. A variety of computing devices utilize heterogeneous integration, which integrates multiple types of ICs for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for placing a processing node in system packaging to integrate the multiple types of ICs. Some examples are a system-on-a-chip (SOC), multi-chip modules (MCMs) and a system-in-package (SiP).

Regardless of the choice for system packaging, in several uses, the performance of one or more computing systems can depend on the processing node. In one example, the processing node is used within a mobile computing device running several different types of applications and possibly relaying information to multiple users (both local and remote) at one time. In another example, the processing node is used within a desktop. In yet another example, the processing node is one of multiple processing nodes in a socket of a multi-socket server. The server is used to provide services to other computer programs in remote computing devices as well as computer programs within the server.

The memory hierarchy in each of the above variety of computing systems transitions from relatively fast, volatile memory, such as registers on a processor die and caches either located on the processor die or connected to the processor die, to non-volatile and relatively slow memory such as magnetic hard disks. The memory hierarchy provides challenges to maintain high performance for quick access demands by the running computer programs. One challenge is reducing the amount of time in system memory, which is the random access memory (RAM) located beyond the cache subsystems, but does not include the non-volatile disk memory. Synchronous dynamic RAM (SDRAM) and other conventional memory technologies reduce the stall time of system memory due to limited bandwidth, but the access latency does not improve with these techniques. In addition, an appreciable amount of on-die area and power consumption are used to support interfaces and protocols to access the data stored in system memory.

In view of the above, efficient methods and systems for performing efficient memory accesses for a computing system are desired.

BRIEF DESCRIPTION OF THE DRAWINGS

The advantages of the methods and mechanisms described herein may be better understood by referring to the following description in conjunction with the accompanying drawings, in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient memory accesses for a computing system are disclosed. In various embodiments, a computing system includes one or more clients for processing applications. Examples of the clients are a general-purpose central processing unit (CPU), a graphics processing unit (GPU), an accelerated processing unit (APU), an input/output (I/O) device and so forth. A memory controller is configured to transfer traffic between the memory controller and two channels, each connected to a memory device. In some embodiments, one or more of the two memory devices is one of a variety of random access memories (RAMs) on a dual in-line memory module (DIMM). In other embodiments, one or more of the two memory devices is a planar mounted RAM device, which is a RAM device that is either socketed or soldered onto a motherboard. In yet other embodiments, one or more of the two memory devices is a three-dimensional integrated circuit (3D IC). In an embodiment, a command processor in the memory controller translates memory requests received from clients to commands to be processed by the selected type(s) of memory devices.

In an embodiment, a client sends a 64-byte memory request with an indication specifying that there are two 32-byte requests targeting non-contiguous data within a same page. The memory controller generates two addresses. The memory controller sends a single command and the two addresses to two channels to access data in a same page. In one embodiment, the memory controller sends the separate, generated two addresses, or a portion thereof, to the two channels. In some embodiments, one address is an offset relative to the other address of the two generated addresses. In some embodiments, the single command with the two addresses accesses non-contiguous data in the same page. In other embodiments, the single command with the two addresses accesses contiguous data in the same page. Therefore, neighboring data (within the same page), which is contiguous data or non-contiguous data, are accessed simultaneously. Therefore, the memory controller does not transfer 64 bytes for a single 32-byte memory request and discards 32 bytes of the 64 bytes, which is inefficient. Rather, the memory controller transfers 64 bytes for two 32-byte memory requests accessing data within a range of memory addresses such as within a page of memory.

Figure 1:
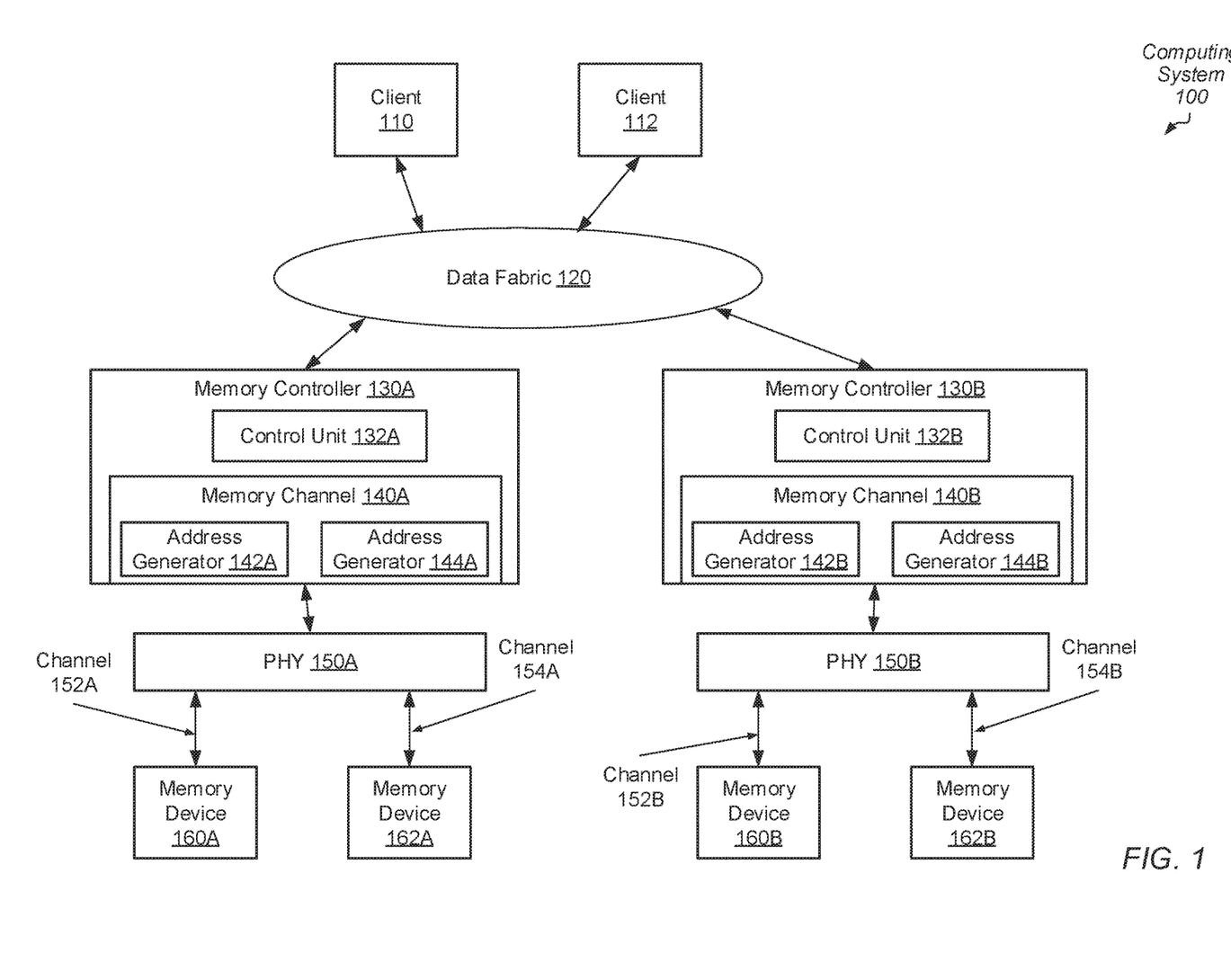
FIG. 1 is a block diagram of one embodiment of a computing system.

Referring to FIG. 1, a generalized block diagram of one embodiment of a computing system 100 is shown. As shown, clients 110 and 112 send memory requests to memory controllers 130A and 130B via data fabric 120. As shown, each memory controller has a single memory channel capable of sending two addresses. For example, memory controller 130A includes memory channel 140A with address generator 142A and address generator 144A. Similarly, memory controller 130B includes memory channel 140B with address generator 142B and address generator 144B. Memory controller 130A transfers commands, addresses and data on channels 152A and 154A to memory devices 160A and 162A. Memory controller 130B transfers commands, addresses and data on channels 152B and 154B to memory devices 160B and 162B.

An input/output (I/O) interface for I/O devices, a power manager, and any links and interfaces for network connections are not shown in computing system 100 for ease of illustration. In some embodiments, the components of computing system 100 are individual dies on an integrated circuit (IC), such as a system-on-a-chip (SOC). In other embodiments, the components are individual dies in a system-in-package (SiP) or a multi-chip module (MCM). In some embodiments, clients 110 and 112 include one or more of a central processing unit (CPU), a graphics processing unit (GPU), a hub for a multimedia engine, and so forth. Each of clients 110 and 112 is one of a variety of computing resources capable of processing applications and generating memory requests.

When one of clients 110-112 is a central processing unit (CPU), in some embodiments, each of the one or more processor cores in the CPU includes circuitry for executing instructions according to a given selected instruction set architecture (ISA). In various embodiments, each of the processor cores in the CPU includes a superscalar, multi-threaded microarchitecture used for processing instructions of the given ISA. In an embodiment, when one of clients 110-112 is a graphics processing unit (GPU), it includes a high parallel data microarchitecture with a significant number of parallel execution lanes. In one embodiment, the microarchitecture uses single-instruction-multiple-data (SIMD) pipeline for the parallel execution lanes. When one of clients 110-112 is a multimedia engine, it includes processors for processing audio data and visual data for multimedia applications. Other examples of processing units that generate memory requests for clients 110-112 are possible and contemplated.

In various embodiments, communication fabric 120 transfers traffic back and forth between clients 110 and 112 and memory controllers 130A and 130B. Data fabric 120 includes interfaces for supporting respective communication protocols. In some embodiments, communication fabric 120 includes queues for storing requests and responses, selection logic for arbitrating between received requests before sending requests across an internal network, logic for building and decoding packets, and logic for selecting routes for the packets.

In various embodiments, memory controllers 130A-130B receive memory requests from clients 110-112 via communication fabric 120, translate the memory requests to commands, and send the commands to one or more of off-chip disk memory (not shown) and system memory, which is implemented as one of a variety of random access memories (RAMs) in memory devices 160A, 162A, 160B and 162B. Memory controller 130 also receives responses from memory devices 160A, 162A, 160B and 162B and disk memory and sends the responses to a corresponding source of clients 110-112.

In some embodiments, the address space of the computing system 100 is divided among at least clients 110-112 and one or more other components such as input/output peripheral devices (not shown) and other types of computing resources. Memory maps are maintained for determining which addresses are mapped to which component, and hence to which one of clients 110-112 a memory request for a particular address should be routed. One or more of clients 110-112 include cache memory subsystems to reduce memory latencies for a respective processor core. In addition, in some embodiments, a shared cache memory subsystem is used by processor cores as a last-level cache (LLC) before accessing memory devices 160A, 162A, 160B and 162B. As used herein, the term "memory access" refers to performing a memory read request or a memory write request operation that results in a cache hit if the requested data of a corresponding request address resides in the cache. Alternatively, the memory access request results in a cache miss if the requested data does not reside in the cache.

In various embodiments, system memory includes a multi-channel memory architecture. This type of architecture increases the transfer speed of data to memory controllers 130A and 130B by adding more channels of communication between them such as channels 152A, 154A, 152B and 154B. In an embodiment, the multi-channel architecture utilizes multiple memory modules and a motherboard and/or a card capable of supporting multiple channels.

In some embodiments, computing system 100 utilizes one of a variety of dynamic RAM (DRAM) to provide system memory. In other embodiments, computing system 100 utilizes three-dimensional integrated circuits (3D ICs) to provide system memory. In such an embodiment, the 3D integrated DRAM provides both low-latency interconnects and additional on-chip memory storage to reduce off-chip memory accesses. Other memory technologies for system memory that use a row-based access scheme including one or more row buffers or other equivalent structures are possible and contemplated. Examples of other memory technologies include phase-change memories, spin-torque-transfer resistive memories, memristors, and so forth.

In various embodiments, the components within memory controller 130B have the same functionality of as the components in memory controller 130A. In some embodiments, control units 132A and 132B within memory controllers 130A and 130B translate received memory requests to transactions such as read/write transactions and activation and precharge transactions. As used herein, "transactions" are also referred to as "commands." In various embodiments, each one of channels 152A, 154A, 152B and 154B is a link, which includes a command bus, an address bus and a data bus for multiple banks within a respective one of memory devices 160A, 162A, 160B and 162B.

In various embodiments, memory devices 160A, 162A, 160B and 162B include multiple ranks, each with multiple memory array banks. Each of the banks includes multiple rows and a row buffer. Each row buffer stores data corresponding to an accessed row of the multiple rows within the memory array banks. The accessed row is identified by a DRAM address in the received memory request. Typically, each row stores a page of data. The size of the page is chosen based on design considerations. Such a page size can be one kilobyte (1 KB), four kilobytes (4 KB), or any other size.

Memory channels 140A and 140B interface with PHY 150A and 150B. In some embodiments, each of the physical interfaces PHY 150A and 150B convey a stream of commands from memory controllers 130A and 130B to memory devices 160A, 162A, 160B and 162B with a given timing. A protocol determines values used for information transfer, such as a number of data transfers per clock cycle, signal voltage levels, signal timings, signal and clock phases and clock frequencies. In some embodiments, each of PHY 150A and 150B include a state machine for initialization and calibration sequences specified in the protocol.

In addition, in an embodiment, each of PHY 150A and 150B include self-test, diagnostic, and error-detection and correction hardware. Protocol examples for a respective interface between PHY 150A and 150B and memory devices 160A, 162A, 160B and 162B include DDR2 SDRAM, DDR3 SDRAM, GDDR4 (Graphics Double Data Rate, version 4) SDRAM, GDDR5 SDRAM, and GDDR6 SDRAM.

As shown, memory channel 140A includes address generators 142A and 144A, and memory channel 140B includes address generators 142B and 144B. In various embodiments, address generators 142A and 144A translate a memory request address received by memory controller 130A to values identifying a given rank, a given bank and a given row in one of the memory devices 160A and 162A. Although two address generators are shown, in other embodiments, another number of address generators are included in memory controller 130A.

In some embodiments, address generator 144A generates a second address as an offset relative to a first address generated by address generator 142A. In one embodiment, address generator 144A uses the same identifiers in the second address as does the first address generated by address generator 142A for identifying a given rank and a given bank and a given row within one of the memory devices 160A and 162A. In addition, in an embodiment, the first address identifies a starting byte of requested first data in the identified row and the second address identifies a starting byte of requested second data that does not overlap the first data. In an embodiment, the second data is contiguous with the first data in the identified row. In other embodiments, the second data is not contiguous with the first data in the identified row. Therefore, the single memory controller 130A transfers data and commands to the two channels 152A and 154A while also supporting simultaneous access to data in a same row for two different requests.

In various embodiments, control unit 132A stores an indication that a given memory access command services each of a first memory request and a second memory request different from the first memory request when control unit 132A determines each of the first memory request and the second memory request targets data within a given range of memory addresses. In an embodiment, the given range of memory addresses is a range for a page of memory in one of memory devices 160A and 162A. In some embodiments, control unit 130A marks each of the first memory request and the second memory request as complete responsive to determining the given memory access command has completed.

Figure 2:
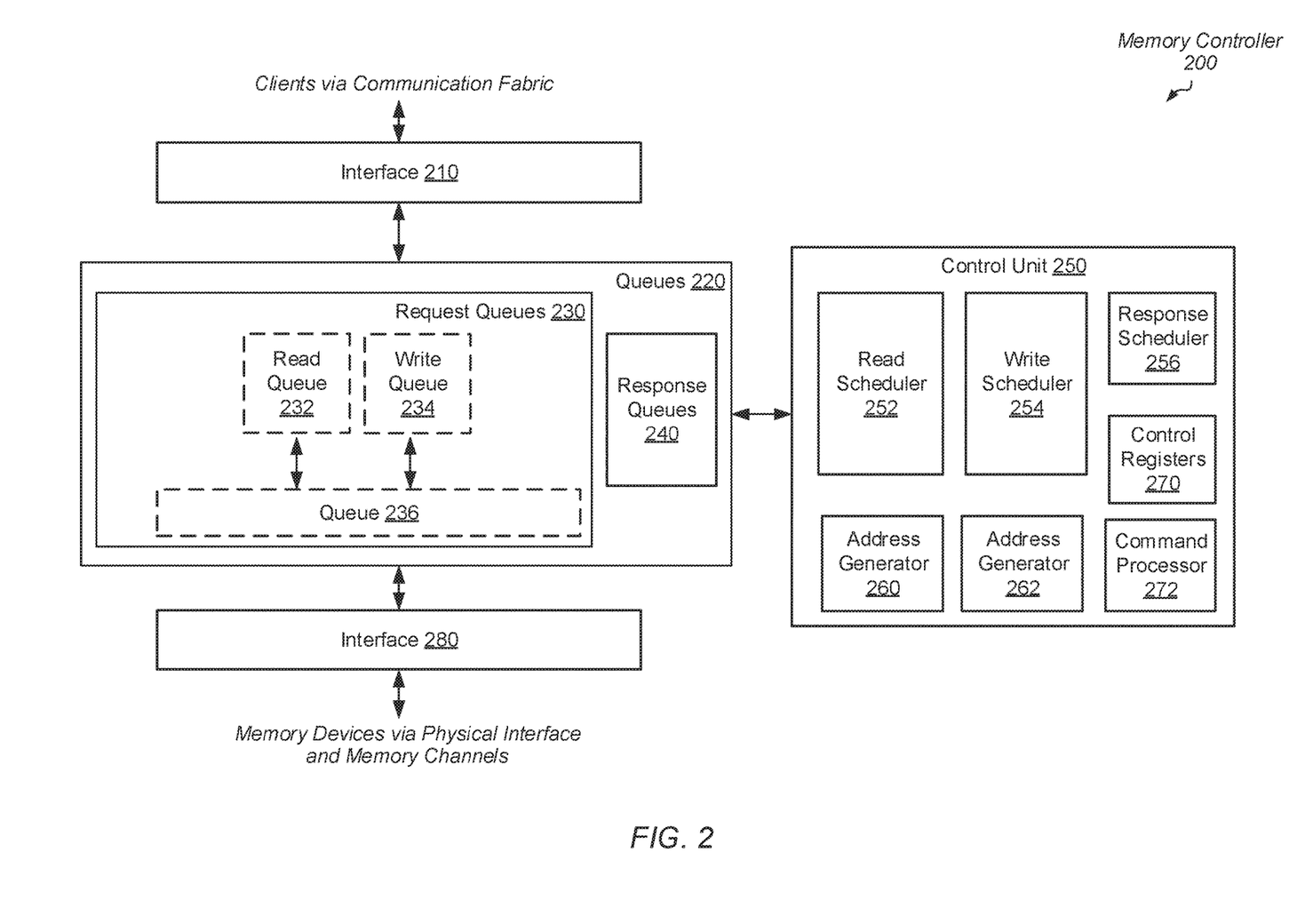
FIG. 2 is a block diagram of one embodiment of a memory controller.

Referring to FIG. 2, a generalized block diagram of one embodiment of a memory controller 200 is shown. In the illustrated embodiment, memory controller 200 includes an interface 210 to computing resources via a communication fabric, queues 220 for storing received memory access requests and received responses, control unit 250 and an interface 280 to memory devices via at least a physical interface and at least two channels. Each of interfaces 210 and 280 supports respective communication protocols.

In an embodiment, queues 220 includes a read queue 232 for storing received read requests and a separate write queue 234 for storing received write requests. In other embodiments, queues 220 includes a unified queue for storing both memory read requests and memory write requests. In one embodiment, queues 220 includes queue 236 for storing scheduled memory access requests selected from read queue 232, write queue 234 or a unified queue if one is used. Queue 236 is also referred to as pending queue 236. In some embodiments, control registers 270 store an indication of a current mode. For example, the off-chip memory data bus and memory device support either a read mode or a write mode at a given time. Therefore, traffic is routed in a given single direction during the current mode and changes direction when the current mode ends.

In some embodiments, read scheduler 252 includes arbitration logic for selecting read requests from the read queue 232 out-of-order. Read scheduler 252 schedules the out-of-order issue of the stored requests within the read queue 232 to the memory device based on a quality-of-service (QoS) or other priority information, age, a process or thread identifier (ID), and a relationship with other stored requests such as targeting a same memory channel, targeting a same rank, targeting a same bank and/or targeting a same page. Write scheduler 254 includes similar selection logic for the write queue 234. In an embodiment, response scheduler 256 includes similar logic for issuing, based on priorities, responses out-of-order to the computing resources, which were received from the memory device.

In various embodiments, command processor 272 translates received memory requests to one or more transactions (or commands) such as read/write transactions and activation and precharge transactions. In some embodiments, the commands are stored in queues 232-236. In other embodiments, a separate set of queues are used. As shown, control unit 250 includes address generators 260 and 262. In various embodiments, address generators 260 and 262 translate a memory request address received by memory controller 130A to values identifying a given rank, a given bank and a given row in one of the memory devices connected to memory controller 200. Although two address generators are shown, in other embodiments, another number of address generators are included in control unit 250.

In some embodiments, address generator 262 generates a second address as an offset relative to a first address generated by address generator 260. In one embodiment, address generator 262 uses the same identifiers in the second address as does the first address for identifying a given rank and a given bank and a given row within one of the memory devices. In addition, in an embodiment, the first address identifies a starting byte of requested data in the identified row and the second address identifies a starting byte of requested data that does not overlap the first data and it is not contiguous with the first data in the identified row. Therefore, the single memory controller 200 transfers data and commands to at least two channels while also supporting simultaneous access to non-contiguous data.

In various embodiments, control unit 250 stores an indication that a given memory access command stored in queues 220 services each of a first memory request and a second memory request different from the first memory request stored in queues 220 when control unit 250 determines each of the first memory request and the second memory request targets data within a given range of memory addresses. In an embodiment, the given range of memory addresses is an address range for a page of memory in one of the memory devices. In some embodiments, control unit 250 marks each of the first memory request and the second memory request as complete responsive to determining the given memory access command has completed.

In some embodiments, control registers 270 store an indication of a current mode. For example, the memory data bus and memory device support either a read mode or a write mode at a given time. Therefore, traffic is routed in a given single direction during the current mode and changes direction when the current mode is changed after a data bus turnaround latency. In various embodiments, control registers 270 store a threshold number of read requests (read burst length) to send during the read mode. In some embodiments, control registers 270 store weights for criteria used by selection algorithms in read scheduler 252 and write scheduler 254 for selecting requests stored in queues 232-236 to issue.

Similar to computing system 100, connecting two memory channels to memory controller 200 is referred to as "ganging." Each of the at least two channels connected to memory controller 200 via a physical interface receives a same command accessing data in a same page within a selected memory device. In addition, each channel has its own address. For example, a first channel receives a first address from address generator 260 and a second channel different from the first channel receives a second address from address generator 262. In an embodiment, the addresses generated by address generators 260 and 262 are column addresses for DRAM. In various embodiments, memory controller 200 simultaneously accesses non-contiguous data.

In some embodiments, memory controller 200 supports the GDDR6 DRAM protocol. In such embodiments, interface 280 supports read and write transactions per channel (of the two channels) with a width of 16 bits (2 bytes) and the burst length is 16. The two ganged 16-bit wide channels provide the equivalent of a 32-bit (4 byte) wide channel. For 64-byte requests, the 32-bit (4 byte) wide equivalent channel provided by the two channels and the burst length of 16 transfers 64 bytes for servicing a 64-byte memory request. The two channels are ganged and memory controller 200 manages both 16-bit wide interfaces.

In the embodiment using the GDDR6 protocol, control unit 250 manages the 64-byte interface as two independent 32-byte interfaces for 32-byte requests. In an embodiment, control unit 250 sends commands to simultaneously open the same page across both 16-bit channels. For example, control unit 250 issues an activate command to each of the two channels at the same time, and issues a memory access command to each of the two channels at the same time, but control unit 250 sends two different addresses via address generators 260 and 262 to simultaneously and independently access the opened page. Neighboring data (within the same page), which is also non-contiguous data, are accessed simultaneously. Therefore, memory controller 200 does not transfer 64 bytes for a single 32-byte memory request and discards 32 bytes of the 64 bytes, which is inefficient. Rather, memory controller 200 transfers 64 bytes for two 32-byte memory requests accessing non-contiguous data within a range of memory addresses such as within a page of memory.

In some embodiments, control unit 250 determines when two 32-byte memory requests access non-contiguous data within a same page in one of the memory devices. In other embodiments, a client, such as a GPU, determines when two 32-byte memory requests access a same page in one of the memory devices. The client sends a 64-byte memory request with an indication specifying that there are two 32-byte requests targeting non-contiguous data within a same page. In an embodiment, when control unit 250 issues a 64-byte command, the address from address generator 262 is ignored.

Figure 3:
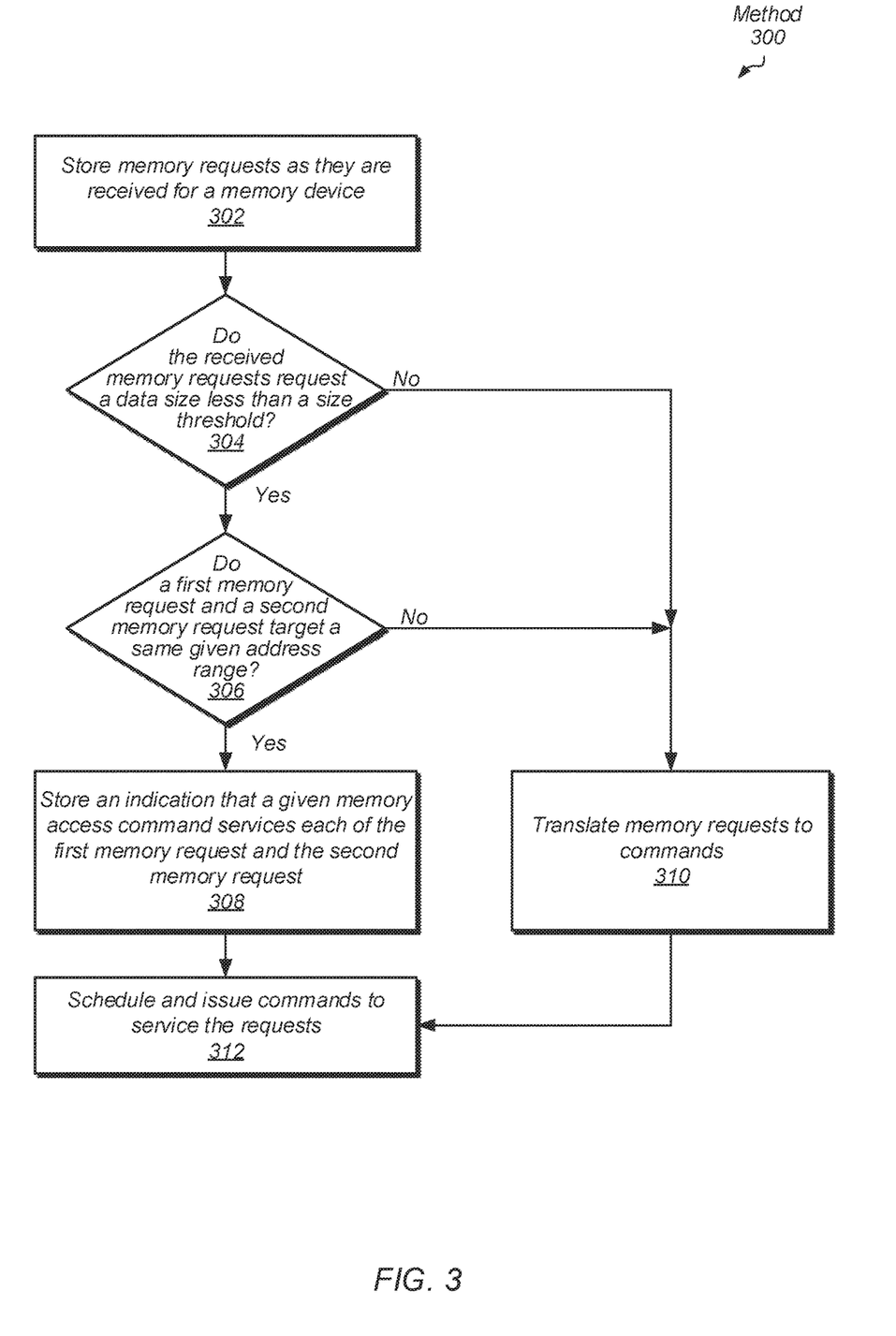
FIG. 3 is a flow diagram of one embodiment of a method for performing efficient memory accesses for a computing system.

Referring now to FIG. 3, one embodiment of a method 300 for performing efficient memory accesses for a computing system is shown. For purposes of discussion, the steps in this embodiment (as well as in FIG. 4) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

One or more clients execute computer programs, or software applications. The client determines a given memory access request misses within a cache memory subsystem and sends the memory access request to system memory via a memory controller. The memory requests are stored as they are received (block 302). If the received memory requests do not request data with a data size less than a size threshold ("no" branch of the conditional block 304), then memory requests are translated to commands (block 310). In some embodiments, memory requests request data with sizes of 64 bytes and 32 bytes. In an embodiment, the size threshold is set at 64 bytes. Therefore, a memory request requesting data with a data size of 64 bytes does not request data with a data size less than the size threshold.

In various embodiments, a memory request, such as a memory read request, is converted into one or more commands based on the memory being accessed. For example, control logic within DRAM performs complex transactions such as activation (opening) transactions and precharge of data and control lines within DRAM once to access an identified row and once to put back the modified contents stored in the row buffer to the identified row during a close transaction. Each of the different DRAM transactions, such as activation/open, column access, read access, write access, and precharge/close, has a different respective latency.

The memory access commands are scheduled for issue to service the memory requests (block 312). In some embodiments, the memory access commands are marked for out-of-order issue based at least upon priorities and targets of the corresponding memory requests. In other embodiments, the memory requests are scheduled prior to translation to commands. Therefore, the memory controller supports out-of-order issue for the memory requests.

If the received memory requests have a data size less than a size threshold ("yes" branch of the conditional block 304), and a first memory request and a second memory request do not target a same given address range ("no" branch of the conditional block 306), then method 300 moves to block 310 where memory requests are translated to commands. However, if the received memory requests have a data size less than a size of the memory data bus ("yes" branch of the conditional block 304), and a first memory request and a second memory request target a same given address range ("yes" branch of the conditional block 306), then an indication that a given memory access command services each of the first memory request and the second memory request is stored (block 308). Afterward, method 300 moves to block 310 where memory requests are translated to commands.

Figure 4:
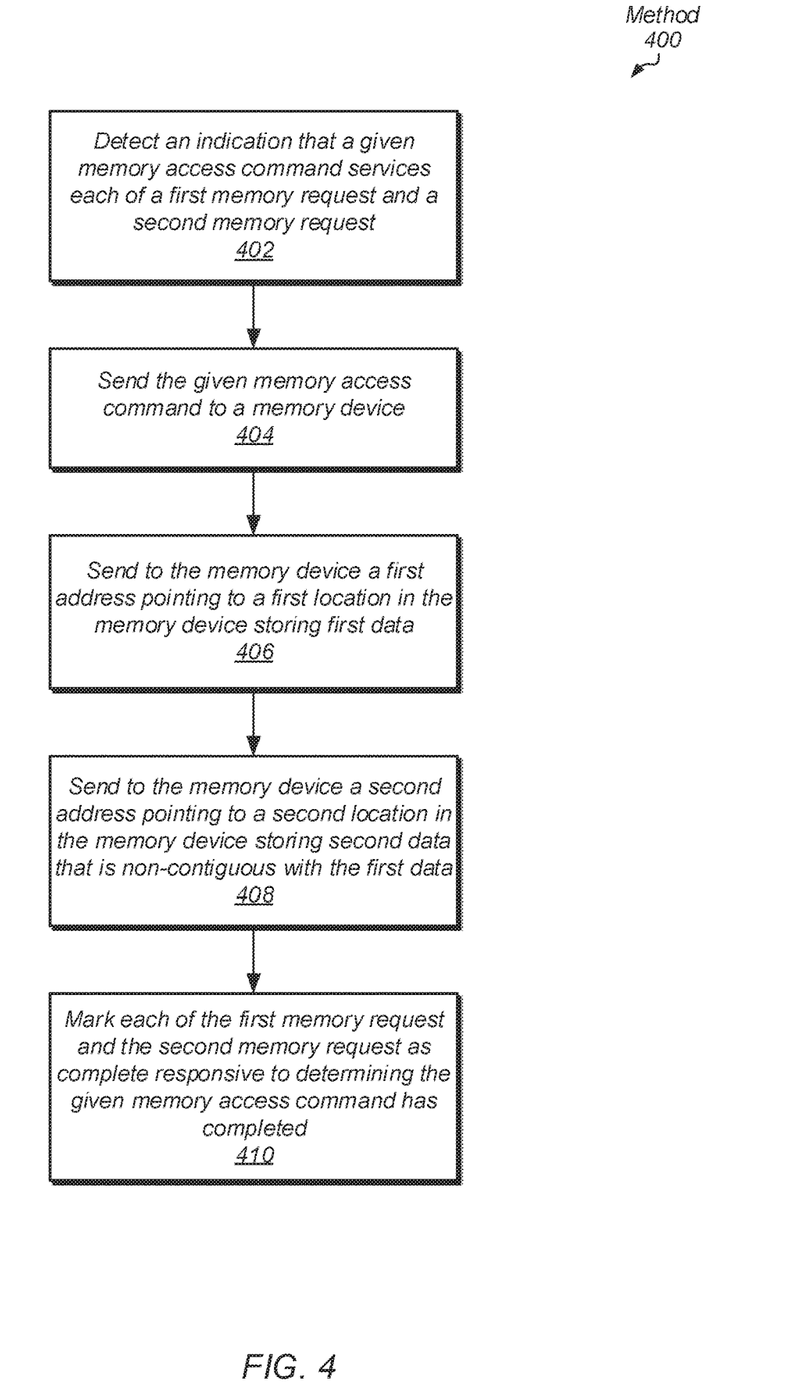
FIG. 4 is a flow diagram of one embodiment of a method for performing efficient memory accesses for a computing system.

Turning to FIG. 4, one embodiment of a method 400 for performing efficient memory accesses for a computing system is shown. An indication is detected that a given memory access command services each of a first memory request and a second memory request (block 402). The given memory access command is sent to a memory device (block 404). For example, scheduling logic in a memory controller selects the given memory access command for issue to the memory device based on priority levels, age, and so forth.

The memory controller sends to the memory device a first address pointing to a first location in the memory device storing first data (block 406). The memory controller sends to the memory device a second address pointing to a second location in the memory device storing second data that is non-contiguous with the first data (block 408). Each of the first memory request and the second memory request are marked as complete responsive to determining the given memory access command has completed (block 410).

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A memory controller comprising:
   a first interface comprising circuitry configured to
      receive one or more client memory requests including a single client memory request that contains an indication targeting two non-contiguous data addresses that correspond to a first memory request and a second memory request;
   a second interface comprising:
      a command bus configured to send memory access commands corresponding to the memory requests to a memory device comprising a plurality of rows, each row configured to store data having a row size;
      a first address bus configured to send addresses to the memory device; and
      a second address bus configured to send addresses to the memory device; and
   a control unit comprising circuitry, wherein in response to determining a memory access command corresponding to the single client memory request is scheduled to be issued at a given point in time and detecting an indication that the memory access command services both the first memory request and the second memory request, in response the control unit is configured to:
      send at the given point in time:
         the memory access command to the memory device via the command bus;
         a first address, corresponding to the first memory request, on the first address bus, wherein the first address points to a first location in the memory device storing first data; and
         a second address, corresponding to the second memory request, on the second address bus, wherein the second address points to a second location in the memory device storing second data, wherein each of the first address and the second address identifies a same row having the row size of the plurality of rows of the memory device, wherein each of the first address and the second address identifies a same row having the row size of the plurality of rows of the memory device.

2. The memory controller as recited in claim 1, wherein the control unit is further configured to store the indication in response to determining that each of the first memory request and the second memory request target data within a given range of memory addresses.

3. The memory controller as recited in claim 2, wherein the given range of memory addresses correspond to a single page of memory.

4. The memory controller as recited in claim 1, wherein the first memory request targets data that is non-contiguous with data targeted by the second memory request.

5. The memory controller as recited in claim 1, wherein:
   the second address is an offset relative to the first address; and
   the memory access command accesses each of the first data and the second data.

6. The memory controller as recited in claim 1, wherein each of the first memory request and the second memory request target data having a same size.

7. The memory controller as recited in claim 1, wherein:
   the second interface further comprises a data bus for transferring data between the memory controller and the memory device; and
   the first data and the second data are transferred simultaneously on the data bus.

8. The memory controller as recited in claim 1, wherein the control unit is further configured to mark each of the first memory request and the second memory request as complete responsive to determining the memory access command has completed.

9. A method, comprising:
   receiving, by a first interface comprising circuitry, one or more client memory requests including a single client memory request that contains an indication targeting two non-contiguous data addresses that correspond to a first memory request and a second memory request;
   sending, by a control unit comprising circuitry via a command bus in a second interface, memory access commands corresponding to the memory requests to a memory device comprising a plurality of rows, each row configured to store data having a row size;
   sending, by the control unit via a first address bus in the second interface, addresses to the memory device;
   sending, by the control unit via a second address bus in the second interface, addresses to the memory device;
   in response to determining a given memory access command corresponding to the single client memory request is scheduled to be issued at a given point in time and detecting an indication that the memory access command services both the first memory request and the second memory request:
in response sending, by the control unit, at the given point in time:
the memory access command to the memory device;
a first address, corresponding to the first memory request, on the first address bus, wherein the first address points to a first location in the memory device storing first data; and
a second address, corresponding to the second memory request, on the second address bus, wherein the second address points to a second location in the memory device storing second data, wherein each of the first address and the second address identifies a same row having the row size of the plurality of rows of the memory device.

10. The method as recited in claim 9, further comprising storing in response to determining that each of the first memory request and the second memory request target data within a given range of memory addresses.

11. The method as recited in claim 10, wherein the given range of memory addresses correspond to a single page of memory.

12. The method as recited in claim 9, wherein:
the second address is an offset relative to the first address; and
the given memory access command accesses each of the first data and the second data.

13. The method as recited in claim 9, wherein the second data is non-contiguous with the first data.

14. The method as recited in claim 9, wherein the second interface further comprises a data bus for transferring data between the memory controller and the memory device, wherein the first data and the second data are transferred simultaneously on the data bus.

15. The method as recited in claim 9, further comprising marking each of the first memory request and the second memory request as complete responsive to determining the given memory access command has completed.

16. A computing system comprising:
a processor configured to generate memory access requests for data stored in a memory device comprising a plurality of rows, each row configured to store data having a row size; and
a memory controller coupled to the memory device;
wherein the memory controller is configured to
receive one or more client memory requests including a single client memory request that contains an indication targeting two non-contiguous data addresses that correspond to a first memory request and a second memory request; and
in response to determining a memory access command corresponding to the single client memory request is scheduled to be issued at a given point in time and detecting an indication that the memory access command services both the first memory request and the second memory request, in response the memory controller is configured to:
send at the given point in time:
the given memory access command to the memory device via a command bus;
a first address, corresponding to the first memory request, on a first address bus, wherein the first address points to a first location in the memory device storing first data; and
a second address, corresponding to the second memory request, on a second address bus, wherein the second address points to a second location in the memory device storing second data, wherein each of the first address and the second address identifies a same row having the row size of the plurality of rows of the memory device.

17. The computing system as recited in claim 16, wherein the memory controller is further configured to store the indication in response to determining that each of the first memory request and the second memory request target data within a given range of memory addresses.

18. The computing system as recited in claim 16, wherein the given range of memory addresses correspond to a single page of memory.

19. The computing system as recited in claim 16, wherein the memory controller is further configured to mark each of the first memory request and the second memory request as complete responsive to determining the memory access command has completed.

* * * * *

UNITED STATES PATENT AND TRADEMARK OFFICE
CERTIFICATE OF CORRECTION

PATENT NO. : 11,422,707 B2
APPLICATION NO. : 15/851479
DATED : August 23, 2022
INVENTOR(S) : Magro et al.

It is certified that error appears in the above-identified patent and that said Letters Patent is hereby corrected as shown below:

In the Claims

Column 11, Claim 9, Line 5, please delete "in response sending," and substitute -- sending, --.

Column 12, Claim 16, Line 17, please delete "the given memory" and substitute -- the memory --.

Signed and Sealed this
Eleventh Day of October, 2022

*Katherine Kelly Vidal*

Katherine Kelly Vidal
*Director of the United States Patent and Trademark Office*